United States Patent
Callard et al.

(10) Patent No.: US 9,503,208 B2
(45) Date of Patent: *Nov. 22, 2016

(54) COORDINATED MULTIPOINT (COMP) TECHNIQUES FOR REDUCING DOWNLINK INTERFERENCE FROM UPLINK SIGNALS

(71) Applicant: Huawei Technologies Co., Ltd., Shenzhen (CN)

(72) Inventors: Aaron James Callard, Ottawa (CA); Alex Stephenne, Stittsville (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 15/048,692

(22) Filed: Feb. 19, 2016

(65) Prior Publication Data

US 2016/0173218 A1 Jun. 16, 2016

Related U.S. Application Data

(63) Continuation of application No. 13/959,272, filed on Aug. 5, 2013, now Pat. No. 9,294,214.

(51) Int. Cl.
*H04B 1/00* (2006.01)
*H04J 11/00* (2006.01)
(Continued)

(52) U.S. Cl.
CPC ............ *H04J 11/0056* (2013.01); *H04L 1/004* (2013.01); *H04L 5/0032* (2013.01); *H04L 5/0073* (2013.01); *H04W 72/082* (2013.01); *H04W 88/12* (2013.01)

(58) Field of Classification Search
USPC ............ 455/63.1, 67.11, 67.13, 501
See application file for complete search history.

(56) References Cited

U.S. PATENT DOCUMENTS

| 2008/0064432 A1* | 3/2008 | Park ..................... H04B 1/126 455/522 |
| 2012/0020256 A1 | 1/2012 | Tujkovic et al. |

(Continued)

FOREIGN PATENT DOCUMENTS

| CN | 102595582 A | 7/2012 |
| CN | 103052074 A | 4/2013 |

OTHER PUBLICATIONS

Holma, H., "Interference considerations for the time division duplex mode of the UMTS Terrestrial Radio Access," IEEE Journal on Selected Areas in Communications, vol. 18, No. 8, Aug. 2000, pp. 1386-1393.

(Continued)

*Primary Examiner* — Fayyaz Alam
(74) *Attorney, Agent, or Firm* — Slater Matsil, LLP (57) ABSTRACT

Base stations (BSs) can remove inter-BS interference components from received uplink signals using downlink information communicated over a backhaul network. The downlink information is associated with downlink transmissions of neighboring base stations, and is used to remove the inter-BS interference in accordance with interference cancellation techniques, e.g., signal interference cancellation (SIC), etc. The downlink information includes information associated with downlink transmission of the interfering BSs, such as information bits (e.g., data), parity information, control information, modulation and coding scheme (MCS) parameters, forward error correction (FEC) parameters, and other information. Additionally, inter-BS interference can be suppressed using channel information of interference channels using interference suppression techniques, e.g., interference rejection combining (IRC), etc.

20 Claims, 6 Drawing Sheets

(51) Int. Cl.
*H04L 1/00* (2006.01)
*H04L 5/00* (2006.01)
*H04W 72/08* (2009.01)
*H04W 88/12* (2009.01)

(56) References Cited

U.S. PATENT DOCUMENTS

2014/0274096 A1* 9/2014 Stanwood ............ H04J 11/0056
455/452.1
2015/0016411 A1* 1/2015 Xiao .................. H04W 52/243
370/330
2015/0173087 A1* 6/2015 Lampinen ......... H04L 25/03891
370/329

OTHER PUBLICATIONS

International Search Report and Written Opinion received in International Application No. PCT/CN2014/083200, mailed Nov. 3, 2014, 12 pages.

Sun, R., et al. "Literature Survey: Transceiver Design for Interference Management in Multiuse Networks", Department of Electrical and Computer Engineering, University of Minnesota, received Apr. 15, 2011, 36 pages.

* cited by examiner

COORDINATED MULTIPOINT (COMP) TECHNIQUES FOR REDUCING DOWNLINK INTERFERENCE FROM UPLINK SIGNALS

This patent application is a continuation of U.S. Non-Provisional application Ser. No. 13/959,272, filed on Aug. 5, 2013 and entitled "Coordinated Multipoint (COMP) Techniques for Reducing Downlink Interference from Uplink Signals," which is hereby incorporated by reference herein as if reproduced in its entirety.

TECHNICAL FIELD

The present invention relates generally to wireless communications, and in particular embodiments, to coordinated multipoint (COMP) techniques for reducing downlink interference from uplink signals.

BACKGROUND

Modern wireless networks often include implementations where neighboring base stations (BSs) transmit and receive wireless signals over common network resources, such as when multiple base stations operate in a full duplex communication mode. As a result, one base station may receive an uplink transmission over the same radio resources (e.g., time-frequency resources, etc.) in which a neighboring base stations performs downlink transmissions, thereby causing the received uplink transmission to include interference attributable to the downlink transmissions. Interference from neighboring base stations may be significant, particularly when there is a line of sight (LoS) connection between the interfering and interfered base stations. Accordingly, techniques for mitigating inter-BS interference are desired.

SUMMARY OF THE INVENTION

Technical advantages are generally achieved, by embodiments of this disclosure which describe coordinated multipoint (COMP) techniques for reducing downlink interference from uplink signals.

In accordance with an embodiment, a method for reducing downlink interference from received uplink signals is provided. In this example, the method includes receiving an uplink signal comprising an uplink transmission from a mobile device and interference attributable to downlink transmissions of one or more interfering base stations. The uplink and downlink transmissions are communicated over common radio resources. The method further includes receiving downlink information from the one or more interfering base stations over a backhaul network. The downlink information corresponds to the downlink transmissions of the one or more interfering base stations. The method further includes removing at least some of the interference from the uplink signal in accordance with the downlink information. An apparatus for performing this method is also provided.

In accordance with another embodiment, a method for reducing downlink interference from uplink channels is provided. In this example, the method includes performing a downlink transmission to one or more mobile devices. The downlink transmission interferes with uplink transmissions received by one or more neighboring base stations. The method further includes communicating downlink information to the one or more neighboring base stations over a backhaul network. The downlink information is associated with the downlink transmission. An apparatus for performing this method is also provided.

In accordance with yet another embodiment, a method for reducing interference in a network is provided. In this example, the method includes identifying one or more primary interfering base stations associated with an interfered base station. The one or more primary interfering base stations are configured to perform downlink transmissions over radio resources in which the interfered base station receives uplink transmissions. The method further includes establishing an interval for transferring downlink information from the one or more primary interfering base stations to the interfered base station. The downlink information is configured to be used for removing interference attributable to the downlink transmissions from the uplink transmissions received by the interfered base station. An apparatus for performing this method is also provided.

BRIEF DESCRIPTION OF THE DRAWINGS

For a more complete understanding of the present disclosure, and the advantages thereof, reference is now made to the following descriptions taken in conjunction with the accompanying drawings, in which.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

The making and using of embodiments of this disclosure are discussed in detail below. It should be appreciated, however, that the concepts disclosed herein can be embodied in a wide variety of specific contexts, and that the specific embodiments discussed herein are merely illustrative and do not serve to limit the scope of the claims. Further, it should be understood that various changes, substitutions, and alterations can be made herein without departing from the spirit and scope of this disclosure as defined by the appended claims.

Aspects of this disclosure allow base stations to remove inter-BS interference components from received uplink signals using downlink information communicated over a backhaul network. The downlink information is associated with downlink transmissions of neighboring base stations, and is used to remove interference attributable to those downlink transmissions from the received uplink signal in accordance with interference cancellation techniques, e.g., signal interference cancellation (SIC), etc. The downlink information may include any information associated with the corresponding downlink transmission, such as information bits (e.g., data), parity information, control information, modulation and coding scheme (MCS) parameters, forward error correction (FEC) parameters, and others. Additional aspects of this disclosure suppress inter-BS interference using channel information of interference channels extending between interfered and interfering base stations. More specifically, an interfered base station obtains the channel information by performing channel estimation on signals transmitted by the interfering base stations, and thereafter uses the channel information to perform an interference suppression technique, e.g., interference rejection combining (IRC), etc. In some embodiments, the interference suppression technique may rely on downlink information in addition to the channel information of the interfering channels.

Figure 1:
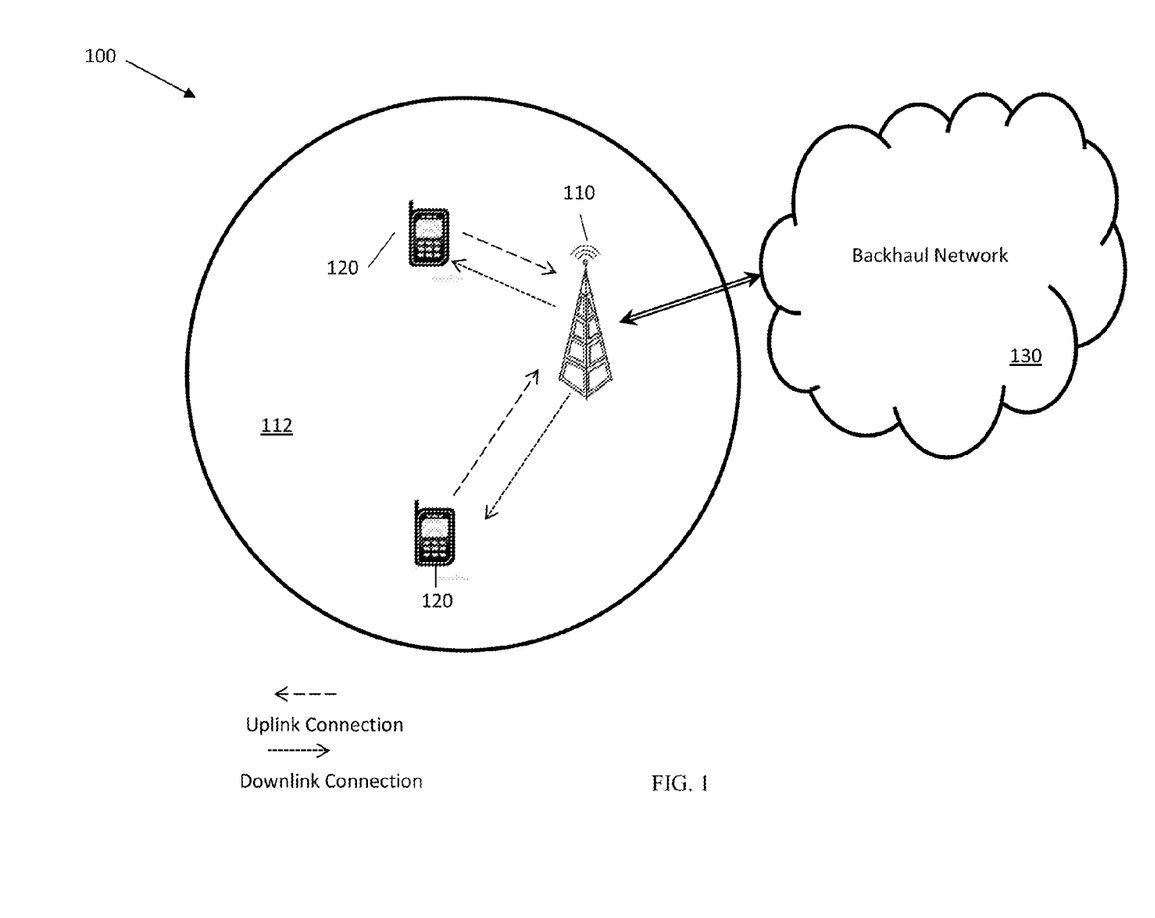
FIG. 1 illustrates a diagram of a wireless network for communicating data.

FIG. 1 illustrates a network 100 for communicating data. The network 100 comprises an access point (AP) 110 having a coverage area 112, a plurality of user equipments (UEs) 120, and a backhaul network 130. The AP 110 may comprise any component capable of providing wireless access by, inter alia, establishing uplink (dashed line) and/or downlink (dotted line) connections with the UEs 120, such as a base station, an enhanced base station (eNB), a femtocell, and other wirelessly enabled devices. The UEs 120 may comprise any component capable of establishing a wireless connection with the AP 110. The backhaul network 130 may be any component or collection of components that allow data to be exchanged between the AP 110 and a remote end (not shown). In some embodiments, the network 100 may comprise various other wireless devices, such as relays, femtocells, etc.

Figure 2:
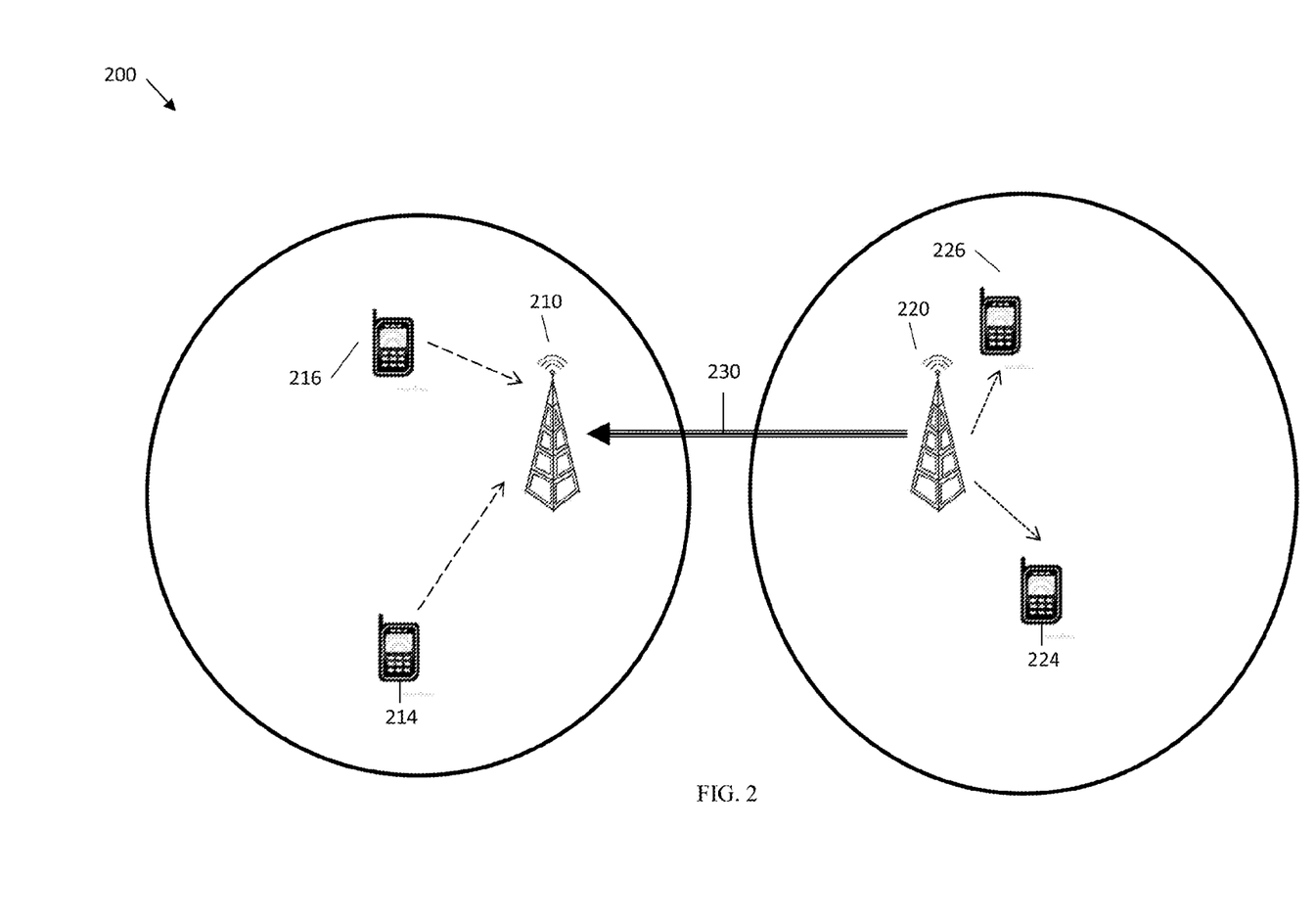
FIG. 2 illustrates a diagram of another wireless network for communicating data.

In some situations, a base station may perform a downlink transmission over the same radio resources (e.g., time-frequency resources, etc.) in which a neighboring base station is receiving an uplink transmission. Consequently, the downlink transmission may produce interference in the received uplink transmission. FIG. 2 illustrates a network 200 in which downlink transmissions from a base station (BS) 220 interfere with uplink signals received by a BS 210. As shown, the BS 210 is receiving uplink transmission from the mobile stations 214, 216 over the same radio resources in which the BS 220 is performing downlink transmissions to the mobile stations 224, 226. As a result, the uplink signals received by the BS 210 include an interference signal component 230 along with the uplink transmission components communicated by the mobile stations 214, 216.

Aspects of this disclosure provide mechanisms for allowing an interfered base station to remove interference from received uplink signals that resulted from downlink transmissions of a neighboring/interfering base station. More specifically, the interfered base station receives downlink information from the interfering base station over a backhaul network, and then proceeds to remove interference from the received uplink signals in accordance with an interference cancellation technique (e.g., signal interference cancellation (SIC), etc.) using that downlink information.

Figure 3:
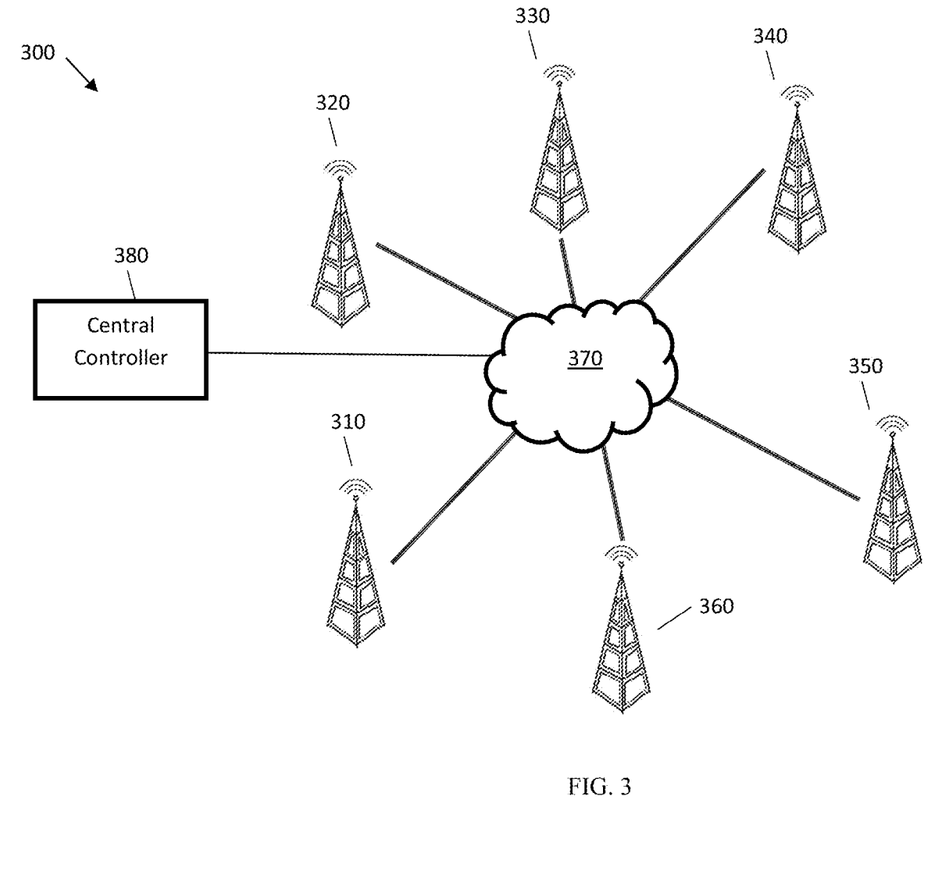
FIG. 3 illustrates a diagram of a wireless network comprising a cluster of neighboring base stations.

The techniques described herein may be implemented between two or more neighboring base stations. FIG. 3 illustrates a network 300 comprising a plurality of BSs 310-360 that are connected via a backhaul network 370. The backhaul network 370 may be any network that allows the BSs 310-360 to communicate in an efficient manner. In one embodiment, the backhaul network 370 is a centralized wire-line network. In such embodiments, the network 300 may include a centralized controller 380 configured to, inter alia, facilitate inter-BS interference cancellation. For example, the centralized controller 380 may facilitate the identification of main interfering base stations for a given interfered base station, as well as facilitate the distribution (periodic or otherwise) of downlink information from those main interfering base stations to the interfered base station. In other embodiments, the backhaul network 370 is a distributed wire-line network. In such embodiments, the BSs 310-360 may collectively perform inter-BS interference cancellation techniques without any help from the centralized controller 380 (which may be excluded from the network 300).

Figure 4:
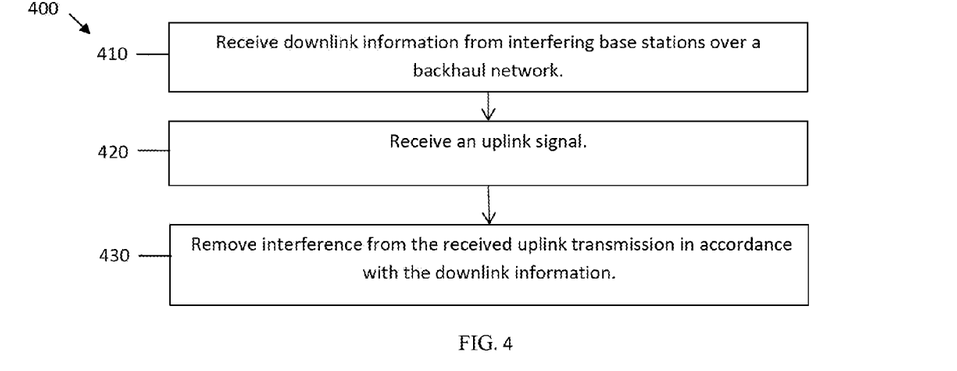
FIG. 4 illustrates a flowchart of an embodiment method for mitigating interference between neighboring base stations.

FIG. 4 illustrates a method 400 for mitigating inter-BS interference, as might be performed by an interfered base station. As shown, the method 400 begins with step 410, where the interfered base station receives downlink information from interfering base stations over a backhaul network. Thereafter, the method 400 proceeds to step 420, wherein the interfered base station receives an uplink signal. The uplink signal may include uplink transmissions from one or more mobile devices as well as interference attributable to downlink transmission of the interfering base stations. The steps 410-420 may occur concurrently, in the order described, or in a reverse order, depending on network configurations/characteristics, e.g., transmission delays, latency in the backhaul network, etc. Next, the method 400 may proceed to step 430, where the interfered base station removes interference from the received uplink signal in accordance with the downlink information communicated over the backhaul network. The interference may be removed using an interference cancellation techniques, e.g., SIC, etc. In some embodiments, the interfered base station may also utilize channel information of the one or more interference channels when removing inter-BS interference from the uplink signal. For example, the interfered base station may obtain channel information of an interference channel by performing channel estimation on signal transmissions (e.g., pilot signals, beacon signals, reference signals, downlink frames, etc.) of a corresponding interfering base station. The interfered base station may then derive a downlink transmission signal of the interfering base station using the downlink information received over the backhaul network, and thereafter modify the downlink transmission signal in accordance with the channel information to obtain an estimate or approximation of the received interference component. Alternatively, the interfered base station may communicate the channel information to the interfering base stations (e.g., over the backhaul network or otherwise) for remote computation of the interference component.

One or more computational steps described herein may be performed at the interfering base stations to reduce a computational/processing load of the interfered base station. For example, interference components can be computed remotely (e.g., away from the interfered base station) by the interfering base stations, which may modify their respective downlink transmissions in accordance with the channel state information of the corresponding interference channel to approximate the interference component received by the interfered base station. Thereafter, the interference component may be communicated to the interfered base station via the backhaul network, thereby allowing the interfered base station to perform inter-BS interference cancellation.

Figure 5:
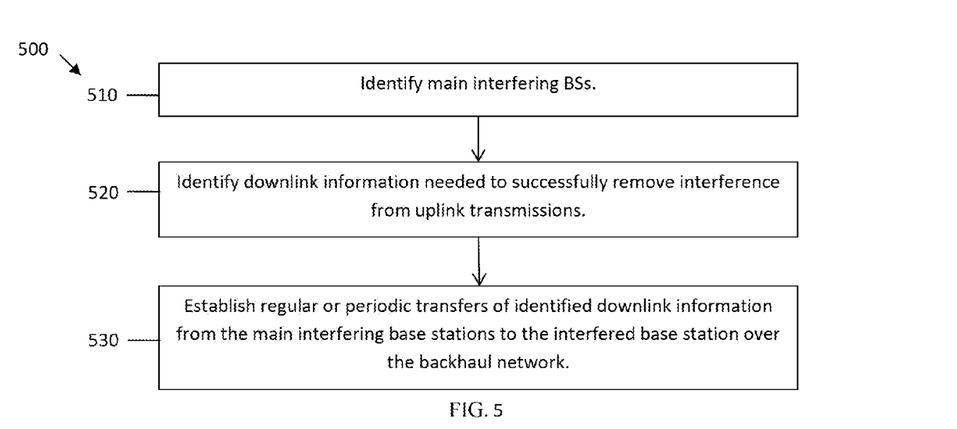
FIG. 5 illustrates a flowchart of another embodiment method for mitigating interference between neighboring base stations.

FIG. 5 illustrates a method 500 for mitigating inter-BS interference, as might be performed by an interfered base station or central controller. As shown, the method 500 begins with step 510, where the interfered base station or central controller identifies main interfering BSs of the interfered base station. Main interferers may be identified using various techniques, such as by measuring pilot signals from nearby cells. Next, the method 500 proceeds to step 520, where the interfered base station or central controller identifies downlink information needed to successfully remove interference from uplink signals. The downlink information may include any information associated with corresponding downlink transmissions, such as information bits (e.g., data), parity information, control information, modulation and coding scheme (MCS) parameters, forward error correction (FEC) parameters, etc. The type and/or amount of downlink information needed to successfully remove interference from uplink signals may vary depending on network conditions/characteristics, e.g., the number of receive antennas, the amount of channel variation, the speed of channel variation, etc. For example, less downlink information may be needed when the interference channel is relatively stable than when the interference channel is varying significantly and/or rapidly. Thereafter, the method 500 proceeds to step 530, where the interfered base station or central controller establishes regular/periodic transfers of the identified downlink information from the main interfering base stations to the interfered base station over the backhaul network. This regular/periodic transfer of downlink information (along with channel information of the interference channels) may allow the interfered base station to systematically remove inter-BS interference from the received signal. Inter-BS interference cancellation may be performed continuously, periodically, or aperiodically, depending on network configurations. For example, inter-BS interference cancellation may be triggered when the interference level in a cell (or in a cluster of cells) exceeds a threshold.

Figure 6:
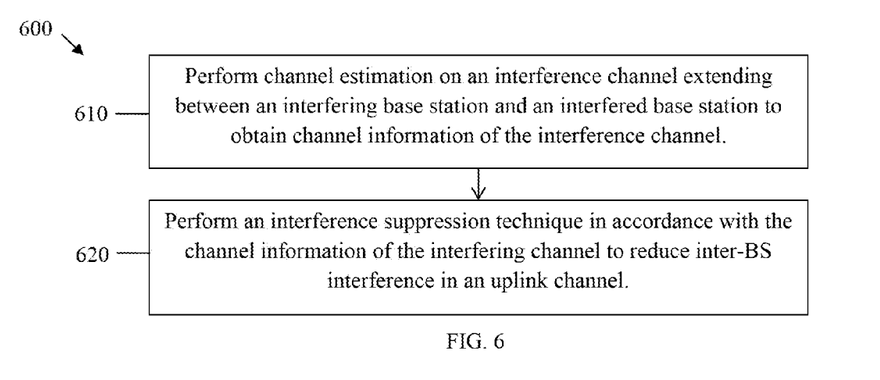
FIG. 6 illustrates a flowchart of another embodiment method for mitigating interference between neighboring base stations.

In some embodiments, interfered base stations perform interference suppression techniques, e.g., interference rejection combining (IRC), etc., in accordance with channel information of interference channels to reduce inter-BS interference in the corresponding uplink channel. FIG. 6 illustrates a method 600 for suppressing inter-BS interference in the uplink channel. As shown, the method 600 begins with step 610, where the interfered base station performs channel estimation on an interference channel extending between an interfering base station and the interfered base station to obtain channel information for the interference channel. Channel estimation may be performed by evaluating signals/transmissions (e.g., pilot signals, beacon signals, reference signals, downlink frames, etc.) of the interfering base station to obtain channel information of the interference channel. The channel information of the interference channel may include channel quality information (CQI), channel state information (CSI), or any other information that describes a characteristic or quality (e.g., fading, gain, etc.) of the interference channel. Thereafter, the method 600 proceeds to step 620, where the interfered base station performs an interference suppression technique (e.g., IRC, etc.) in accordance with the channel information of the interfering channel to reduce inter-BS interference in an uplink channel. In some embodiments, downlink information may also be relied upon when performing interference suppression techniques.

When the interference channel is relatively stable, it may be possible to reduce backhaul network overhead by computing the interference component at the interfering BS, rather than the interfered BS. An interference component (y) may be expressed as y=HPx, where H is the channel between interferer and receiver, P is the precoder used for the downlink transmission, and x is the data stream communicated by the downlink transmission. The value of the interference component (y) can be calculated by the interfering BS, and then communicated to the interfered BS via the backhaul network. Computing the value of the interference component (y) at the interfering BS (rather than at the interfered BS) may reduce the amount of downlink information communicated over the backhaul network, as less data may be required to communicate the interference component (y) than to communicate the precoder (P) and/or the data stream (x). To reduce overhead even further, the value of the interference component (y) could be projected by reducing the rank of y. For example, the rank of y can be reduced by pre-establishing a matrix r and then transmitting the product of the matrix r and the interference component y (r*y), which will reduce overhead (as the product r*y is smaller than y by itself) while resulting in little or no information loss, e.g., the receiver can accurately reproduce the interference component y with little error, when the receiver is within the span of r. Alternatively, values of the precoder (P) and/or the raw data (x) could be quantized to at least some extent, and then communicated (separately or together) over the backhaul network. For greater compression, the values of the information bits could be sent along with the FEC and MCS parameters used to generate the data stream (x), thereby removing at least some of the parity/control information that would otherwise be carried in the data stream (x). The type and/or amount of downlink information that is communicated over the backhaul network may also depend on the nature of the backhaul communication. For example, different OFDM symbols/tones may be included for unicast transmissions than for multicast transmissions.

In some embodiments, communication of the downlink information over the backhaul network may be triggered when interference in a cell or cluster of cells exceeds a threshold, e.g., if |P*H|>thresh. In other embodiments, the downlink information may be continuously communicated over the backhaul network irrespective of interference levels in the network. Interfering BSs may multicast the downlink information over the backhaul network when the downlink information is requested (or otherwise desired) by multiple interfered base stations.

Some embodiments of this disclosure may implement techniques related to null steering. The following is a description of techniques for creating a spatial null at a distant node, which may include applying precoding/scheduling (or other schemes) to reduce the amount of inference at the distant node. A link from an interferer to a receiver can be expressed as y=r*(s+HPx+n), where s is the desired signal, H is the channel between interferer and receiver, P is the precoder used for the data x, and r is the receiver used.

Figure 7:
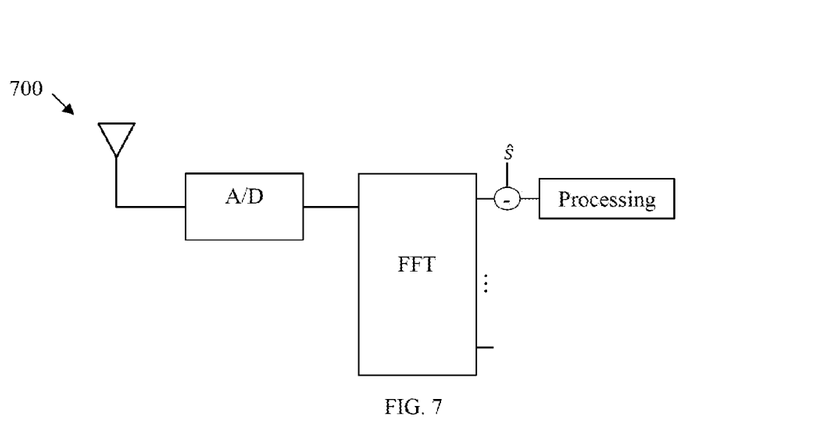
FIG. 7 illustrates a block diagram of an embodiment receiver architecture.
Figure 8:
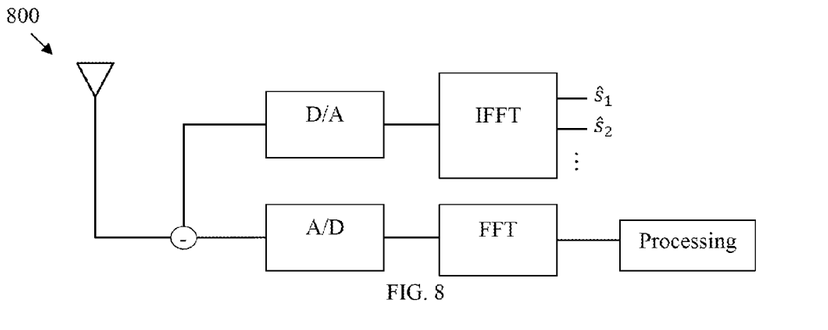
FIG. 8 illustrates a block diagram of another embodiment receiver architecture.

In some embodiments, the removal of interference is done in the digital domain. FIG. 7 illustrates a diagram of a receiver 700 for removing interference in the digital domain. In other embodiments, interference may be removed in the analog domain, which may prevent or reduce receiver desensitization. FIG. 8 illustrates a diagram of a receiver 800 for removing interference in the analog domain. When removing interference in the analog domain, a digital version of the interfering signal may be converted to the analog domain, and then subtracted from the analog received signal. In some embodiments, performing interference cancellation in the analog domain may reduce the magnitude of the received signal, thereby allowing for improved analog to digital (A/D) sensitivity.

Embodiments of this disclosure may be used to select a precoder (P) to mitigate the amount of interference experienced by the receiver or to improve the receiver's ability to remove said interference from the received signal. Aspects of this disclosure may apply coordinated beamforming (and derivative techniques) as well as coordinated scheduling to improve the receiver's knowledge of interference attributable to downlink transmissions from neighboring transmitters. This may be achieved through precoder selection as well as downlink resource assignment. Other aspects may reduce the interference experienced by the receiver using interference adaptation and/or derivative techniques. Interference adaptation techniques (and derivatives thereof) are discussed in University of Minnesota Department of Electrical and Computer Engineering publication entitled "Literature Survey: Transceiver Design for Interference Management in Multiuser Networks," which is incorporated by reference herein as if reproduced in its entirety. Aspects of this disclosure are applicable to unsynchronized time division duplex (TDDs) network environments, as described in Institute of Electrical and Electronics Engineers (IEEE) Journal on Selected Areas In Telecommunications: Special Issue on Wideband CDMA 18, No. 8, pp. 1386-1393, entitled "Interference Considerations for the Time Division Duplex Mode of the UMTS Terrestrial Radio Access," which is incorporated by reference herein as if reproduced in its entirety.

Figure 9:
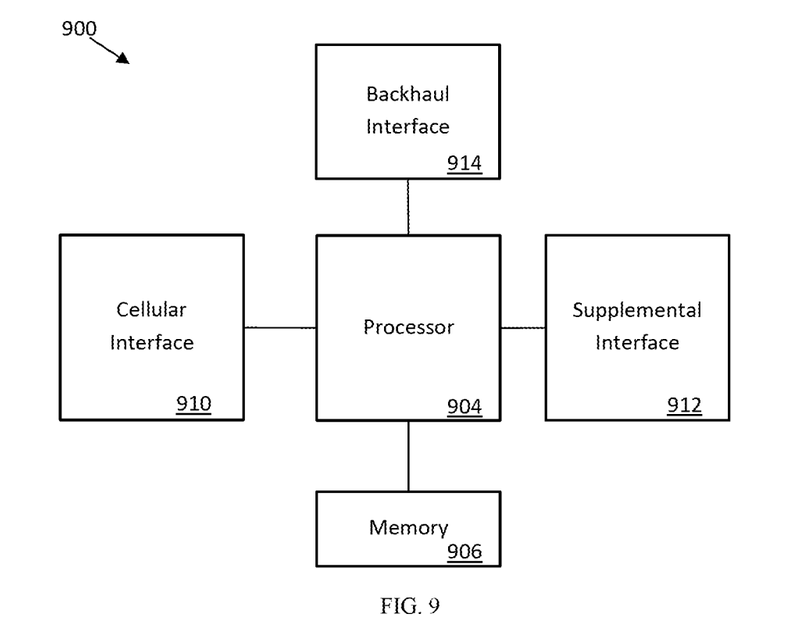
FIG. 9 illustrates a block diagram of an embodiment communications device.

FIG. 9 illustrates a block diagram of an embodiment of a communications device 900, which may be equivalent to one or more devices (e.g., UEs, NBs, etc.) discussed above. The communications device 900 may include a processor 904, a memory 906, a cellular interface 910, a supplemental interface 912, and a backhaul interface 914, which may (or may not) be arranged as shown in FIG. 9. The processor 904 may be any component capable of performing computations and/or other processing related tasks, and the memory 906 may be any component capable of storing programming and/or instructions for the processor 904. The cellular interface 910 may be any component or collection of components that allows the communications device 900 to communicate using a cellular signal, and may be used to receive and/or transmit information over a cellular connection of a cellular network. The supplemental interface 912 may be any component or collection of components that allows the communications device 900 to communicate data or control information via a supplemental protocol. For instance, the supplemental interface 912 may be a non-cellular wireless interface for communicating in accordance with a Wireless-Fidelity (Wi-Fi) or Bluetooth protocol. Alternatively, the supplemental interface 912 may be a wireline interface. The backhaul interface 914 may be optionally included in the communications device 900, and may comprise any component or collection of components that allows the communications device 900 to communicate with another device via a backhaul network.

Although the description has been described in detail, it should be understood that various changes, substitutions and alterations can be made without departing from the spirit and scope of this disclosure as defined by the appended claims. Moreover, the scope of the disclosure is not intended to be limited to the particular embodiments described herein, as one of ordinary skill in the art will readily appreciate from this disclosure that processes, machines, manufacture, compositions of matter, means, methods, or steps, presently existing or later to be developed, may perform substantially the same function or achieve substantially the same result as the corresponding embodiments described herein. Accordingly, the appended claims are intended to include within their scope such processes, machines, manufacture, compositions of matter, means, methods, or steps.

What is claimed is:

1. A method for removing interference from received signals, the method comprising:
    transmitting, by a base station, a serving downlink transmission to a first mobile device, the base station engaged in full-duplexed communications such that uplink and downlink signals are communicated over the same time-frequency resources;
    receiving, by the base station, an uplink signal comprising an uplink transmission from a second mobile device and interference attributable to both the serving downlink transmission and neighboring downlink transmissions of one or more neighboring base stations, wherein the uplink transmission, the serving downlink transmission, and the neighboring downlink transmissions are communicated over the same time-frequency resources;
    receiving, by the base station, downlink information from the one or more neighboring base stations over a backhaul network, the downlink information corresponding to the neighboring downlink transmissions of the one or more neighboring base stations; and
    removing at least some of the interference from the uplink signal in accordance with both the downlink information corresponding to the neighboring downlink transmissions and the serving downlink transmission.

2. The method of claim 1, wherein the downlink information comprises data streams carried by the neighboring downlink transmissions of the one or more neighboring base stations.

3. The method of claim 1, wherein the downlink information includes information bits and parity bits of data streams carried by the neighboring downlink transmissions.

4. The method of claim 1, wherein the downlink information comprises information bits of the neighboring downlink transmissions of the one or more neighboring base stations, the downlink information excluding parity bits of the neighboring downlink transmissions of the one or more neighboring base stations.

5. The method of claim 4, wherein the downlink information further comprises modulation and coding scheme (MCS) parameters and forward error correction (FEC) parameters of the neighboring downlink transmissions of the one or more neighboring base stations.

6. The method of claim 5, further comprising:
    reconstructing the neighboring downlink transmissions in accordance with the information bits, the MCS parameters, and the FEC parameters communicated over the backhaul network; and
    performing signal interference cancellation on the received uplink transmission in accordance with the reconstructed neighboring downlink transmissions.

7. The method of claim 1, wherein the downlink information comprises interference signals associated with the neighboring downlink transmissions, the interference signals being computed by the one or more neighboring base stations.

8. The method of claim 1, wherein removing interference from the received uplink transmission in accordance with the downlink information and the serving downlink transmission includes:

identifying interference channels extending between the base station and the one or more neighboring base stations;
reconstructing the neighboring downlink transmissions in accordance with the downlink information;
computing neighboring interference components in accordance with the reconstructed neighboring downlink transmissions and the interference channels; and
subtracting the neighboring interference components from the received uplink transmission.

9. The method of claim 8, wherein subtracting the interference components from the received uplink transmission comprises:
subtracting the interference components from the received uplink transmission in the digital domain.

10. The method of claim 8, wherein subtracting the interference components from the received uplink transmission comprises:
subtracting the interference components from the received uplink transmission in the analog domain.

11. The method of claim 1, wherein at least some of the one or more neighboring base stations are configured to operate in accordance with a full duplex communication mode.

12. The method of claim 1, wherein removing at least some of the interference from the uplink signal in accordance with both the downlink information corresponding to the neighboring downlink transmissions and the serving downlink transmission comprises:
removing, from the uplink signal, interference corresponding to both the neighboring downlink transmissions and the serving downlink transmission.

13. A base station comprising:
a processor; and
a non-transitory computer readable storage medium storing programming for execution by the processor, the programming including instructions to:
transmit a serving downlink transmission to a first mobile device, the base station engaged in full-duplexed communications such that uplink and downlink signals are communicated over the same time-frequency resources;
receive an uplink signal comprising an uplink transmission from a second mobile device and interference attributable to both the serving downlink transmission and neighboring downlink transmissions of one or more neighboring base stations, wherein the uplink transmission, the serving downlink transmission, and the neighboring downlink transmissions are communicated over the same time-frequency resources;
receive downlink information from the one or more neighboring base stations over a backhaul network, the downlink information corresponding to the neighboring downlink transmissions of the one or more neighboring base stations; and
remove at least some of the interference from the uplink signal in accordance with both the downlink information corresponding to the neighboring downlink transmissions and the serving downlink transmission.

14. The base station of claim 13, wherein the downlink information comprises data streams carried by the neighboring downlink transmissions of the one or more neighboring base stations.

15. The base station of claim 13, wherein the downlink information includes information bits and parity bits of data streams carried by the neighboring downlink transmissions.

16. The base station of claim 13, wherein the downlink information comprises information bits of the neighboring downlink transmissions of the one or more neighboring base stations, but excludes parity bits of the neighboring downlink transmissions of the one or more neighboring base stations.

17. The base station of claim 16, wherein the downlink information further comprises modulation and coding scheme (MCS) parameters and forward error correction (FEC) parameters of the neighboring downlink transmissions of the one or more neighboring base stations.

18. The base station of claim 13, wherein the downlink information comprise interference signals associated with the neighboring downlink transmissions, the interference signals being computed by the one or more neighboring base stations.

19. The base station of claim 13, wherein the instructions to remove interference from the received uplink transmission in accordance with the downlink information and the serving downlink transmission includes instructions to:
identify interference channels extending between the base station and the one or more neighboring base stations;
reconstruct the neighboring downlink transmissions in accordance with the downlink information;
compute neighboring interference components in accordance with the reconstructed neighboring downlink transmissions and the interference channels; and
subtract the neighboring interference components from the received uplink transmission.

20. The base station of claim 13, wherein the instructions to remove at least some of the interference from the uplink signal in accordance with both the downlink information corresponding to the neighboring downlink transmissions and the serving downlink transmission include instructions to:
remove, from the uplink signal, interference corresponding to both the neighboring downlink transmissions and the serving downlink transmission.

* * * * *